(12) United States Patent
Langenegger et al.

(10) Patent No.: US 8,096,542 B2
(45) Date of Patent: Jan. 17, 2012

(54) METHOD AND ARRANGEMENT FOR PRODUCING PERFECT BOUND BOOK BLOCKS

(75) Inventors: Daniel Langenegger, Strengelbach (CH); Konrad Boos, Stettfurt (CH)

(73) Assignee: Mueller Martini Holding AG, Hergiswil (CH)

( * ) Notice: Subject to any disclaimer, the term of this patent is extended or adjusted under 35 U.S.C. 154(b) by 0 days.

(21) Appl. No.: 12/572,547

(22) Filed: Oct. 2, 2009

(65) Prior Publication Data

US 2010/0086379 A1 Apr. 8, 2010

(30) Foreign Application Priority Data

Oct. 2, 2008 (EP) ..................................... 08405248

(51) Int. Cl.
  *B65H 37/04* (2006.01)
  *B65H 29/06* (2006.01)
  *B65H 29/04* (2006.01)
(52) U.S. Cl. ............... 270/52.18; 270/52.14; 270/52.16; 271/82; 271/204
(58) Field of Classification Search ............... 270/52.14, 270/52.16, 52.18; 271/82, 85, 204, 206
See application file for complete search history.

(56) References Cited

U.S. PATENT DOCUMENTS

| | | | |
|---|---|---|---|
| 5,005,815 A | 4/1991 | Auksi | |
| 5,261,520 A | 11/1993 | Duke | |
| 5,660,382 A | 8/1997 | Meier | |
| 6,264,192 B1 * | 7/2001 | Siebenmann et al. | ........ 271/205 |
| 6,702,100 B2 | 3/2004 | Studer | |
| 6,726,201 B2 | 4/2004 | Studer | |
| 6,764,069 B2 | 7/2004 | Reist | |
| 2003/0183999 A1 | 10/2003 | Reist | |
| 2008/0038091 A1* | 2/2008 | Langenegger | ..................... 412/8 |
| 2008/0232931 A1* | 9/2008 | Hug et al. | ......................... 412/8 |

FOREIGN PATENT DOCUMENTS

| | | |
|---|---|---|
| CA | 2 258 089 | 1/1998 |
| DE | 2016425 A1 | 10/1971 |
| DE | 28 10 518 | 10/1978 |
| DE | 29 43 260 A1 | 5/1981 |
| DE | 10 2007 032 604 | 1/2008 |

(Continued)

OTHER PUBLICATIONS

European Search Report dated Apr. 15, 2009, directed to counterpart EP 08405248.9 application. (9 pages).

(Continued)

*Primary Examiner* — Leslie A Nicholson, III
(74) *Attorney, Agent, or Firm* — Venable LLP; Robert Kinberg; Leigh D. Thelen

(57) ABSTRACT

A method for producing perfect-bound book blocks for books or similar printed products, including driving successively arranged clamps to circulate along an endless path of a perfect binding apparatus, positioning loose book blocks composed of gathered printed sheets inside conveying units of a conveying device, supplying the book blocks upon or prior to reaching the transfer region below the endless path to the clamps of the perfect binding apparatus, the supplying including inserting the book blocks into the clamps pivoted by approximately 90° around a perpendicular axis from a processing position for the book blocks and clamping the book blocks in the clamps with spines facing downwards, and transporting the clamped book blocks in an upright position for further processing in the perfect binding apparatus. An arrangement for producing perfect-bound book blocks is also provided.

9 Claims, 5 Drawing Sheets

FOREIGN PATENT DOCUMENTS

| | | |
|---|---|---|
| EP | 0 386 787 A2 | 9/1990 |
| EP | 0 675 005 | 10/1995 |
| EP | 1 528 023 A1 | 8/2004 |
| EP | 1 520 817 | 4/2005 |
| EP | 1 712 495 A2 | 4/2006 |
| EP | 1 669 312 | 6/2006 |
| EP | 1 834 911 | 9/2007 |
| EP | 1 886 832 | 2/2008 |
| EP | 1 886 833 | 2/2008 |
| FR | 2 206 748 | 6/1974 |
| GB | 973639 | 10/1964 |
| GB | 2 055 767 A | 3/1981 |
| WO | WO-96/32293 | 10/1996 |
| WO | WO-98/03422 A1 | 1/1998 |

OTHER PUBLICATIONS

European Search Report, dated Jan. 5, 2007, issued for related European Application No. 06405337.4-2304 (with English-language translation).

European Search Report, dated Feb. 2, 2007, issued for related European Application No. 06405338.2-1251 (with English-language translation).

U.S. Office Action, dated Jul. 19, 2010, issued in related U.S. Appl. No. 11/889,344.

U.S. Office Action dated Jul. 19, 2010, issued in related U.S. Appl. No. 11/889,272.

* cited by examiner

METHOD AND ARRANGEMENT FOR PRODUCING PERFECT BOUND BOOK BLOCKS

CROSS-REFERENCE TO RELATED APPLICATION

This application claims the priority of European patent document 08405248.9, filed on Oct. 2, 2008, the subject matter of which is incorporated herein by reference.

BACKGROUND OF THE INVENTION

The invention relates to a method for producing perfect-bound book blocks for books or similar printed products with the aid of a perfect binding apparatus, provided with clamps arranged at a distance to each other and driven successively along a circular path. The loose book blocks, composed of gathered printed sheets, that are positioned transverse to the conveying direction inside uniformly spaced-apart conveying units on a transfer region are supplied to these clamps once the conveying units reach the transfer region, or before the conveying units reach the transfer region, below the circular path for the perfect binding apparatus and are then clamped into the clamps with the spines facing downward, such that they can be transported while positioned upright for the further processing in the perfect binding apparatus.

Perfect binding methods are disclosed for producing magazines, books, paperback books, catalogs or similar printed products. For this, individual printed sheets are initially gathered in a specific sequence into loose book blocks and are subsequently transported to a perfect binding apparatus for processing the spine region of the printed sheets, applying adhesive and gluing a cover onto the spine. In a final step, the unfinished, bound printed product is normally trimmed precisely along the remaining three side edges to obtain the finished dimensions.

According to a first method disclosed in the prior art, the printed sheets are collected inside a conveying channel of a gathering machine, wherein the spines of the printed sheets are aligned parallel to the conveying direction and, maintaining this alignment, are moved past the processing stations of a perfect binding apparatus while held by clamps driven to circulate along a circular path, wherein the printed sheets are processed in these stations and are provided with a cover. This alignment of the spines parallel to the conveying direction results in an easy transfer of the printed sheets to the perfect binding apparatus and also makes it possible to use a simple design for the processing stations of the perfect binding apparatus. The maximum possible production speed limit in this case is determined by the maximum possible conveying speed inside the gathering channel of the gathering machine, which can still be used without causing flow turbulences to lift lightweight printed sheets off the underneath positioned stack. A gathering machine of this type is described in further detail in the European patent document 1 520 817 A1.

The European patent document 0 675 005 B1 describes a perfect binding apparatus for which the holding components are oriented transverse to the circulation direction and are driven continuously, wherein a printed product can be inserted at the feeding location into each holding component that is passing by. These processing stations are designed to act upon each printed product passing by and are provided with processing tools which at least in some sections travel along with the printed products in circulating direction to process these products while they move along. The production capacity can be increased owing to the fact that the printed sheets are conveyed and transferred with the spines being oriented transverse to the conveying direction. However, the manufacture of the processing stations that move along is extremely involved and expensive and the processing stations are susceptible to malfunctions during the operation.

According to a different approach, disclosed in the European patent document 1 886 832 A1, the printed sheets are collected on stacking tables with the spines aligned transverse to the conveying direction, are subsequently accelerated, are rotated by 90° and then transferred while moving in longitudinal direction to a perfect binding apparatus also moving in longitudinal direction. An increase in the capacity is possible with this method, however the required number of complex configured stacking tables and long transfer region between the collection region and the perfect binding apparatus are disadvantageous.

According to a different reference, European patent document 1 886 833 A1, the printed sheets are gathered on stacking tables with the spines aligned transverse to the conveying direction, are subsequently accelerated, are rotated by 90°, are gripped by grippers attached to a traction device while moving in longitudinal direction, and are then transferred to a perfect binding apparatus moving in longitudinal direction. A production increase is also possible with this method, however the required complex design of the transfer region and the distance between the gathering region and the perfect binding apparatus are disadvantageous.

SUMMARY

It is therefore an object of the present invention to transfer loose book blocks, gathered with the spine arranged transverse to the conveying direction, with high production speed and high processing safety to a perfect binding apparatus, so that they can be processed therein with the spines pointing downward, with the aid of processing stations having a simple design.

The above and other objects may be accomplished according to one aspect of the invention wherein there is provided a method for producing perfect-bound book blocks for books or similar printed products, which, in one embodiment, includes driving successively arranged clamps to circulate along an endless path of a perfect binding apparatus, wherein the clamps are spaced apart at a first distance; positioning loose book blocks composed of gathered printed sheets inside conveying units of a conveying device, wherein the conveying units are arranged spaced apart at a uniform second distance in a transfer region and extend transverse to a conveying direction of the conveying device; supplying the book blocks upon or prior to reaching the transfer region below the endless path to the clamps of the perfect binding apparatus, the supplying including inserting the book blocks into the clamps pivoted by approximately 90° around a perpendicular axis from a processing position for the book blocks and clamping the book blocks in the clamps with spines facing downwards; and transporting the clamped book blocks in an upright position for further processing in the perfect binding apparatus.

The application furthermore relates to an arrangement for producing book blocks composed of adhesive-bound printed sheets for books or similar printed products which, according to one embodiment, includes a perfect binding apparatus including an endless path, clamps to accommodate loose book blocks to be processed, the clamps being successively arranged spaced apart and drivable along the endless path, and at least one processing station positioned along the endless path to process the loose book blocks; and a conveying device comprising successively spaced-apart conveying units, wherein each conveying unit includes a transfer device and is adapted to hold gathered printed sheets, wherein the book blocks are transferred from the conveying units of the conveying device to the clamps of the perfect binding apparatus in a transfer region, wherein the printed sheets extend transverse to a conveying direction in the transfer region and are supplied with synchronous speed to the clamps, and wherein the clamps and the conveying units are arranged in the transfer region of the endless path, aligned transverse to the conveying direction and positioned opposite each other.

BRIEF DESCRIPTION OF THE DRAWINGS

The present invention will be more readily understood from the following detailed description when read in conjunction with the accompanying drawings, in which.

DETAILED DESCRIPTION

Figure 1:
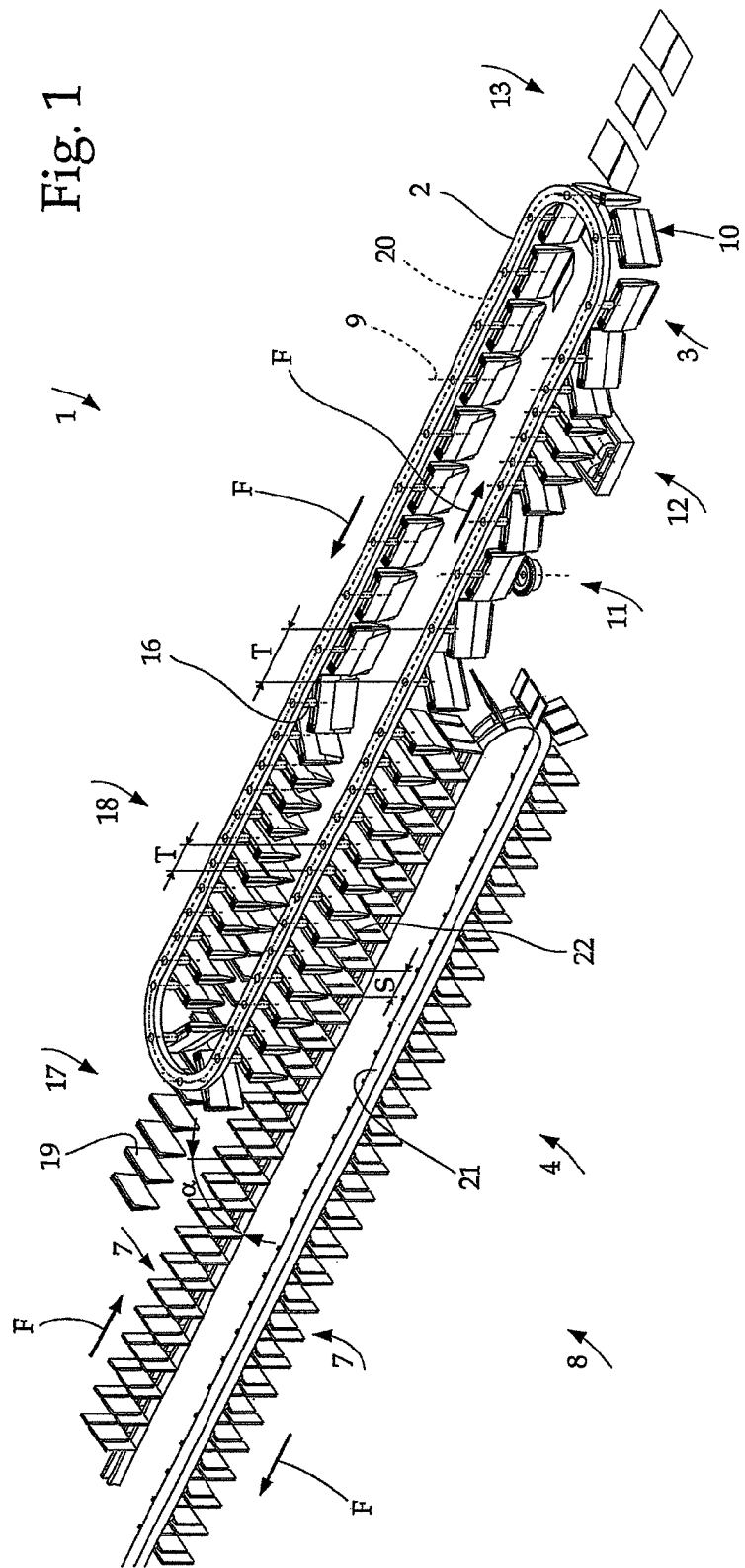
FIG. 1 is a three-dimensional view of an embodiment of a perfect binding apparatus according to the invention.

The embodiments of the perfect binding apparatus 1 shown in FIGS. 1, 2, 4, 5 are intended for producing perfect-bound book blocks 6, composed of printed sheets 5, for books or similar printed products 19. The perfect binding apparatuses 1 include clamps 3, which are arranged successively at changeable distances T and are driven continuously along an endless circular path 2 with the aid of a traction device 20. These clamps 3 hold the loose book blocks 6 that are to be processed by the processing stations while moving past these stations on the perfect binding apparatus 1. FIGS. 1, 2, 4, 5 show examples of processing stations such as a milling machine 11, an adhesive application station 12 for applying adhesive to the spine, and a cover feeding station 13. The use of additional processing stations is conceivable, for example the use of additional milling machines 11, adhesive application stations 12, side adhesive application stations, folding stations, as well as spine-shaping or pressing stations. The perfect binding method used for producing the printed products 19 primarily determines which processing stations are required on the perfect binding apparatus 1.

The printed sheets 5 to be processed in the perfect binding apparatus 1 are first collected in predetermined sequence inside a gathering device, not shown herein, to be assembled into loose book blocks 6 which are then conveyed with synchronized timing by a conveying device 8 to the clamps 3 of the perfect binding apparatus 1 while positioned on a transfer region 4 that is located downstream of the gathering device and upstream of the perfect binding apparatus 1. During the conveying operation, the book blocks are realigned and transferred to the clamps 3 of the perfect binding apparatus 1.

The conveying device 8 consists of conveying units 7 that extend transverse to the conveying direction F and successively follow each other at distances S while moving along a closed guide track 21. In a transfer region 4 that is positioned upstream of the processing stations of the perfect binding apparatus 1, the printed sheets 5 are conveyed inside these conveying units 7 with synchronized timing to the clamps 3.

Upon reaching the transfer region 4, or prior to reaching the transfer region, below the circular path 2 of the perfect binding apparatus 1, the individual loose book blocks 6 are repositioned either horizontally or vertically and are respectively inserted and are respectively clamped into one clamp 3, wherein each clamp is pivoted from one of the processing positions for the book blocks 6 by approximately 90° around a perpendicular axis 9 for the clamping in. In the transfer region 4 of the circular path 2, the opened clamps 3 and the book blocks 6 inside the conveying units 7 are aligned opposite each other and transverse to the conveying direction F. The distances S between the conveying units 7 and the distances T between the clamps 3 are identical in conveying direction F, at least in the transfer region 4. With the aid of a transfer device 14, the loose book blocks 6 which are conveyed in the conveying direction F while positioned transverse to the conveying direction F in the transfer region 4 are then transferred during the conveying operation with a pushing movement from the conveying units 7 to the clamps 3 of the perfect binding apparatus 1. The transfer of the book blocks 6 may occur at an angle α ranging from approximately 0° to 90°, relative to the longitudinal extension of the transfer region 4. The transfer devices 14 may be pushing mechanisms 22 on the conveying units 7, which can be operated with the aid of control rails arranged along the guide track 21. Following the transfer region 4, the clamps 3 are optionally pivoted around the axes 9, arranged perpendicular relative to the conveying direction F, into a processing position in which the spines 10 of the book blocks 6 are aligned parallel to the conveying direction F and subsequently pass by the processing stations of the perfect binding apparatus 1 to be processed into unfinished, bound printed products 19. For this, the distance T between two adjacent clamps 3 is increased.

Perfect binding apparatuses 1 may be provided with processing stations having a simple design, past which the book blocks can be conveyed with the spine 10 aligned in longitudinal direction. It may be advantageous to pass certain processing stations with transverse aligned spines 10 and clamps 3, as is disclosed in the art. For example, the spine 10 can conceivably be aligned transverse while moving past the adhesive applicator 12, thereby making it possible to position the spine and to apply adhesive to the spine in longitudinal spine direction while the doctor blades are standing still and are not highly dynamically stressed. One embodiment of the arrangement, according to the present invention, therefore has a further use since the clamps 3 in the operating position can optionally be positioned either extending in longitudinal or in a transverse direction to the conveying direction F.

Following the processing of the book blocks 6, the clamps 3 and the spines 10 are again aligned transverse to the conveying direction F. The unfinished, bound printed products 19 in a discharge section 18 are transferred transverse to the conveying direction F into a discharge flow 17 and are subsequently discharged to a following conveying system.

For the most part, the operational safety depends on the conveying speed for the book blocks 6 in conveying direction F. As a result of the pivoting ability of the clamps 3 around the perpendicular axis 9, it is possible to have smaller distances T with clamps 3 extending in transverse direction than with clamps 3 extending in longitudinal direction, thereby making it possible to correspondingly reduce the conveying speed while the cycle number remains the same or to increase the cycle number while the conveying speed remains the same. Arrangements where the distance T between two adjacent clamps 3 can be changed are already disclosed in the prior art, for example in German patent document 10 2007 032 604 A1.

According to the embodiment shown in FIG. 1, the collected printed sheets 5 are conveyed while positioned upright in the conveying units 7 of the conveying device 8, one behind the other, wherein the angle α ranges from approximately 45 to 90°. In contrast, with the embodiment shown in FIG. 2, the collected printed sheets 5 are conveyed while stacked one above the other in the conveying units 7 of the conveying device 8 and the angle α ranges from approximately 0 to 45°.

Figure 2:
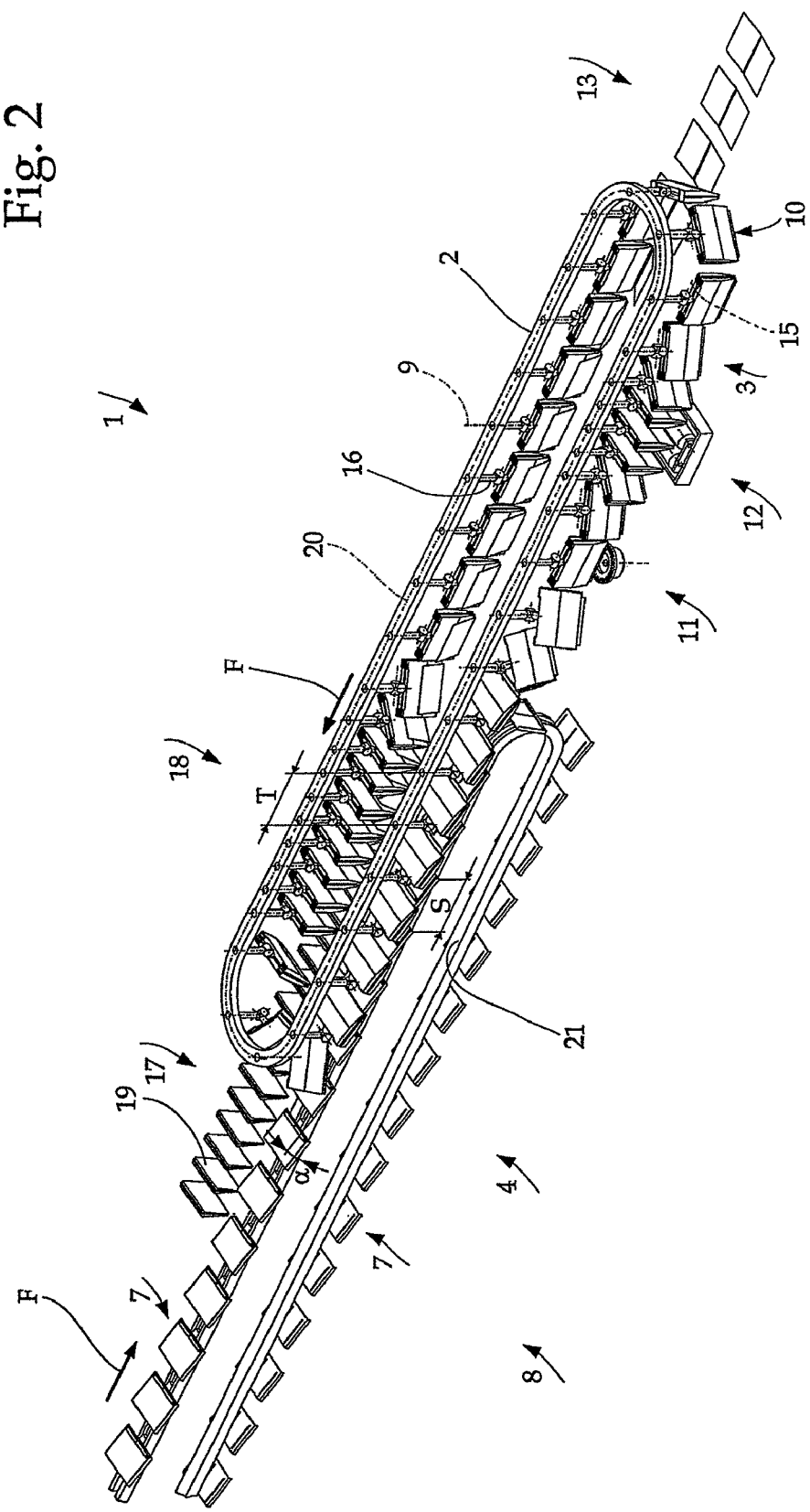
FIG. 2 is a three-dimensional view of another embodiment of a perfect binding apparatus according to the invention.

With the embodiment according to FIG. 2, having an angle α that is smaller than approximately 45°, the clamps 3 of the perfect binding apparatus 1 are additionally embodied such that they can pivot up to approximately 90° around a horizontal axis 15. Prior to reaching the transfer region 4, the clamps 3 are pivoted around the horizontal axis 15 from the vertical to an inclined position, wherein the angle of inclination β of the clamps 3 corresponds approximately to the angle of inclination α of the gathered and stacked printed sheets 5 inside the conveying units 7 of the conveying device 8.

Figure 3:
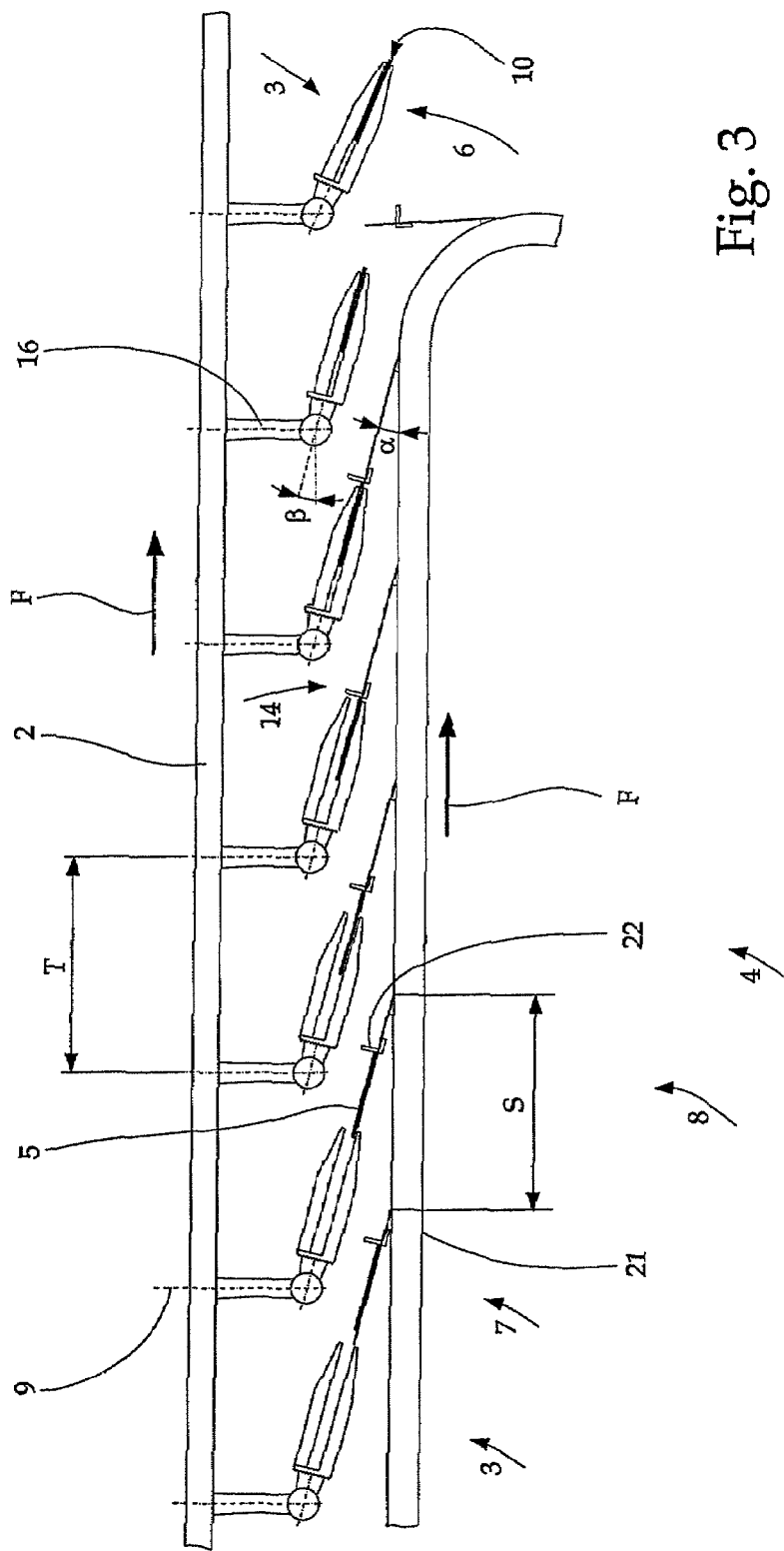
FIG. 3 is a detailed view of the transfer region for the perfect binding apparatus according to FIG. 2.

When conveying stacked printed sheets 5 with the aid of conveying units 7, which are positioned at an angle α between approximately 0 and 45°, these conveying units 7 can have a considerably simpler design than those positioned at an angle of inclination ranging from approximately 45 to 90° since no additional support elements, not shown herein, are needed to prevent a tilting of the printed sheets 5. The access to the printed sheets 5 inside the conveying units 7 positioned at a smaller angle α is therefore easier than with upright positioned conveying units having a large angle α. FIG. 3 shows an enlarged representation of the transfer region 4 of the apparatus shown in FIG. 2.

Figure 4:
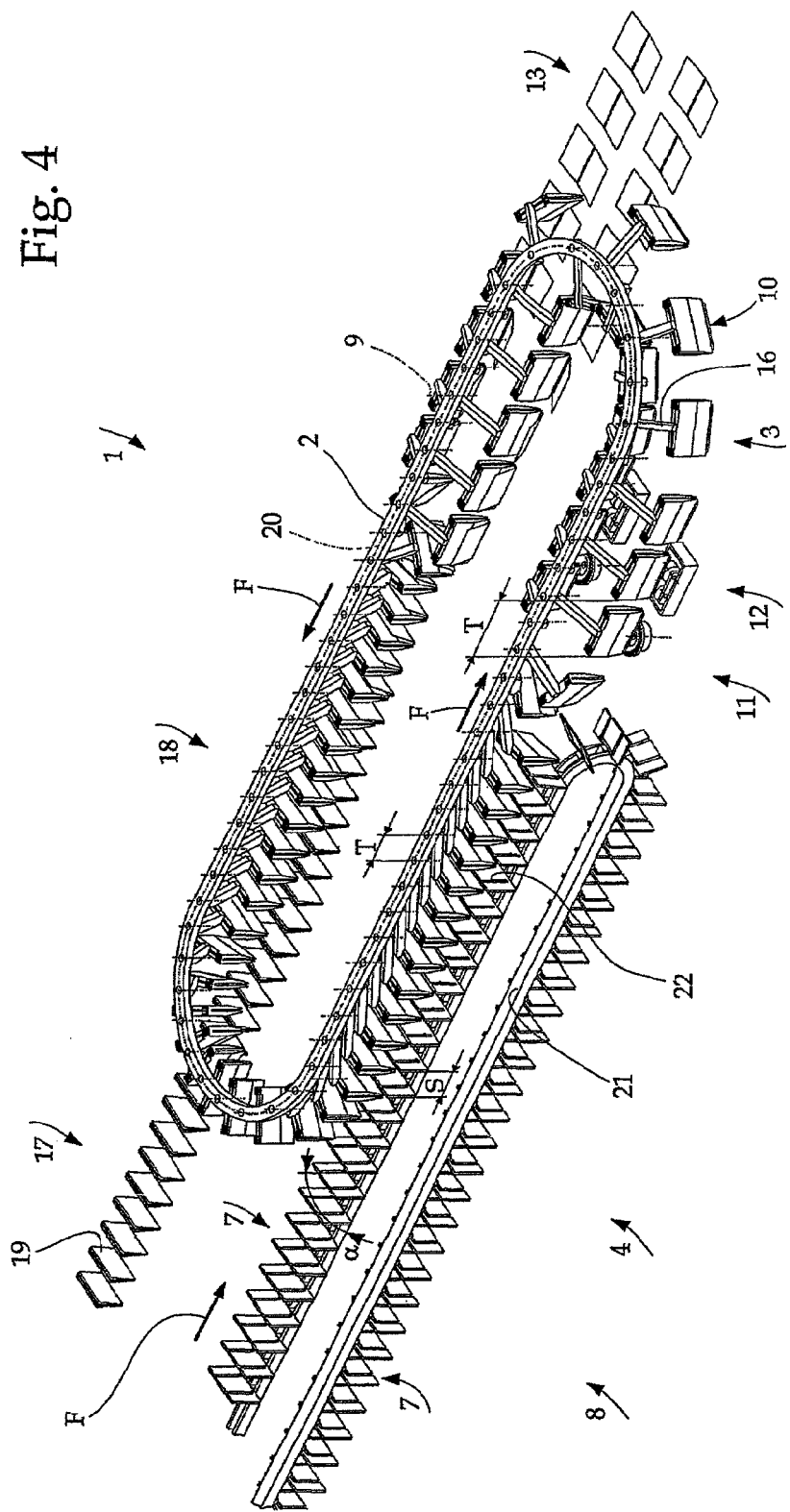
FIG. 4 is a three-dimensional view of an embodiment of a perfect binding apparatus according to the invention.

With the embodiment shown in FIG. 4, the perpendicular axes 9 for the clamps 3 are arranged outside of the clamps 3, wherein following the transfer region 4 the clamps 3 are respectively rotated alternately in clockwise and counter-clockwise direction by up to approximately 90°. Two parallel rows of successively arranged clamps 3 are thus obtained, which are positioned relative to each other at twice the distance T as compared to the transfer region 4. The clamps 3 of the two rows are moved past separate processing stations and are processed therein. A further increase in the capacity can be achieved as a result of distributing the printed products 19 onto two parallel, identical arrangements provided with processing stations.

Figure 5:
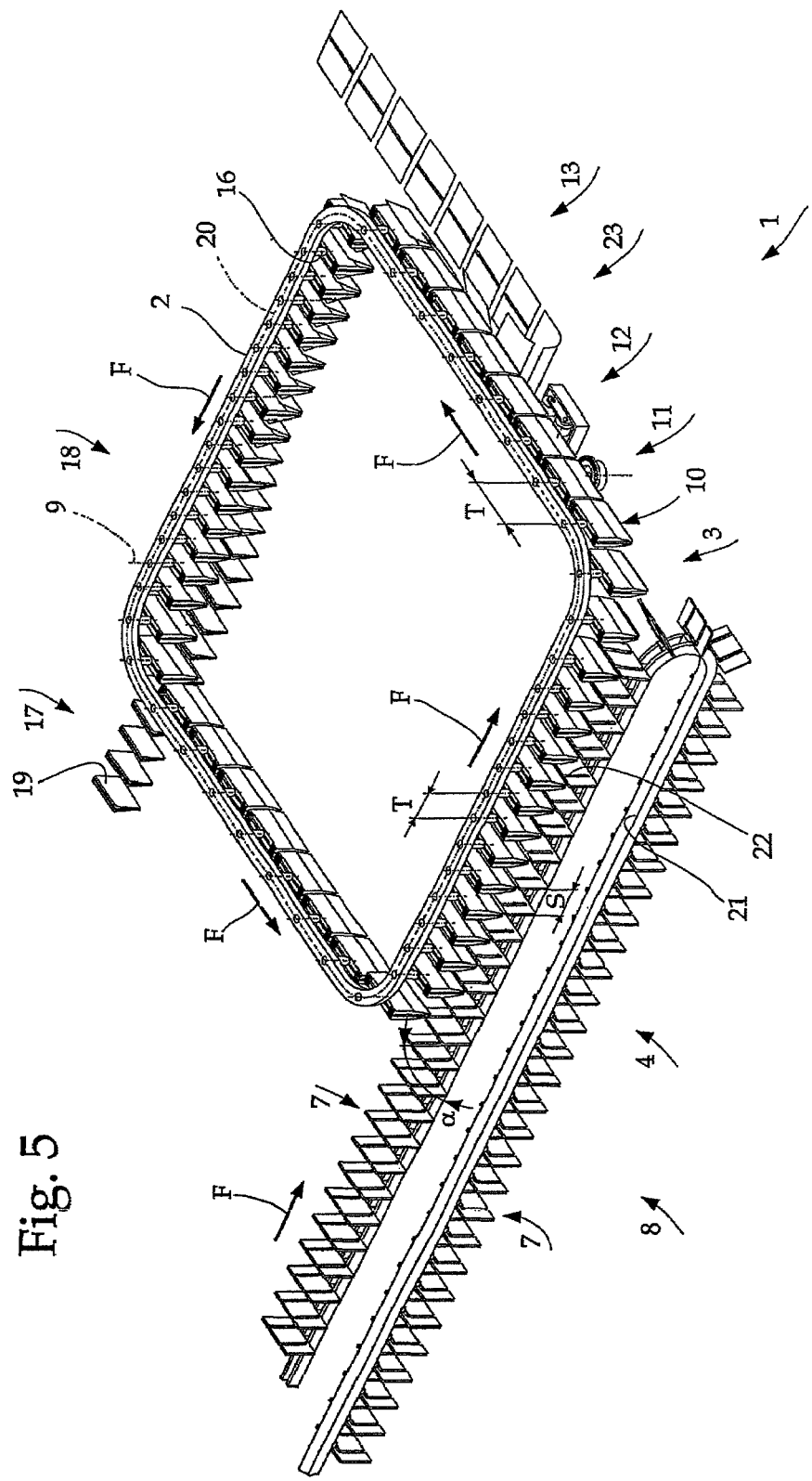
FIG. 5 is a three-dimensional view of an additional embodiment of a perfect binding apparatus according to the invention.

The embodiment of a perfect binding apparatus 1, shown in FIG. 5, essentially corresponds to the embodiment shown in FIG. 1. The only difference is that the circular path 2 comprises four straight sections for supplying, processing and removing the book blocks, wherein the clamps 3 are pivoted around the perpendicular axis 9 in the curved segments of the circular path 2 so that the spatial orientation of the clamps 3 is maintained. A clamp 3 consequently rotates relative to its circular path 2 around the perpendicular axis 9. Following the transfer of the book blocks 6 from the conveying units 7 to the clamps 3, the distance T between the clamps 3 is increased for the further operation while the clamps are located in a section 23 of the circular path 2 that is angled relative to the transfer region 4, wherein processing stations can be arranged in the angled section 23. It is furthermore conceivable to pivot the clamps 3 while they are located in a straight section between the processing stations, in the same way as shown for the embodiment in FIG. 1. The pivoting ability of the clamps 3 is achieved by not attaching them directly to the traction device 20, but by attaching them to a suspension 16 that is positioned between the clamps 3 and the traction device 20.

In place of two axes 9, 15 as shown in FIGS. 2 and 3, which are not arranged parallel to each other, it is also conceivable to pivot the clamps 3 around a spatial axis, wherein the alignment of the clamps 3 during the transfer and the processing of the book blocks 6 must correspond to the alignments specified for this task.

It will be understood that the above description of the present invention is susceptible to various modifications, changes and adaptations, and that the same are intended to be comprehended within the meaning and range of equivalents of the appended claims.

What is claimed is:

1. A method for producing perfect-bound book blocks for books or similar printed products, comprising:
    driving successively arranged clamps to circulate along an endless path of a perfect binding apparatus, wherein the clamps are spaced apart at a first distance;
    conveying loose book blocks in a conveying direction along a conveying device, wherein the loose book blocks are composed of gathered printed sheets and are positioned inside conveying units of the conveying device, wherein the conveying direction of the conveying device and the endless path of the perfect binding apparatus overlap in a transfer region, and wherein the conveying units are arranged spaced apart at a uniform second distance in the transfer region and extend transverse to the conveying direction of the conveying device;
    positioning the book blocks beneath the endless path of the perfect binding apparatus in the transfer region;
    inserting the book blocks into the clamps of the perfect binding apparatus;
    clamping the book blocks in the clamps with spines facing downwards;
    transporting the clamped book blocks in an upright position for further processing in the perfect binding apparatus; and
    pivoting the clamps by approximately 90° around an axis perpendicular to the conveying direction to orient the clamped book blocks for the further processing.

2. The method according to claim 1, further comprising gathering the printed sheets inside the conveying units of the conveying device while standing upright and one behind the other into book blocks.

3. The method according to claim 1, further comprising gathering the printed sheets inside the conveying units of the conveying device while lying upon each other into book blocks.

4. The method according to claim 1, further comprising orienting a conveying unit and a clamp towards each other for the insertion of the book block into the clamp.

5. The method according to claim 4, wherein the inserting comprises pushing the book block at an angle of between 0° and 90° relative to the longitudinal extension of the transfer region.

6. The method according to claim 1, further comprising pivoting the clamps into the processing position following the transfer region.

7. The method according to claim 1, further comprising orienting the clamps, while in the processing station, in a direction that is one of in a longitudinal direction of the conveying direction or transverse to the conveying direction.

8. The method according to claim 1, further comprising processing the book blocks held in the clamps in an angled section of the endless path of the perfect binding apparatus following the insertion of the book blocks, while maintaining the same spatial orientation.

9. The method according to claim 1, further comprising increasing the first distance between the clamps following the transfer of the book blocks for processing.

* * * * *